Sept. 13, 1966 D. C. ALEXANDER ETAL 3,272,995

APPARATUS FOR TRANSLATING A WAVEFORM

Filed July 1, 1964 5 Sheets-Sheet 1

INVENTORS
DAVID C. ALEXANDER
ROBERT H. DENNARD
BY Bernard N. Wiener
ATTORNEY

APPARATUS FOR TRANSLATING A WAVEFORM

Filed July 1, 1964

5 Sheets-Sheet 4

Sept. 13, 1966 D. C. ALEXANDER ETAL 3,272,995

APPARATUS FOR TRANSLATING A WAVEFORM

Filed July 1, 1964 5 Sheets-Sheet 5

United States Patent Office 3,272,995

Patented Sept. 13, 1966

3,272,995

APPARATUS FOR TRANSLATING A WAVEFORM

David C. Alexander, Yorktown Heights, and Robert H. Dennard, Croton-on-Hudson, N.Y., assignors to International Business Machines Corporation, New York, N.Y., a corporation of New York Filed July 1, 1964, Ser. No. 379,519
12 Claims. (Cl. 307—88.5)

This invention relates generally to apparatus for translating a waveform and it relates more particularly to apparatus for reconstructing a rectangular waveform from pulse doublets derived therefrom.

A pulse doublet consists of a positive going pulse portion and a negative going pulse portion. Pulse doublets may be used to represent voltage level transitions of a rectangular waveform. Such doublets may be themselves utilized for information handling by assigning a binary "0" to one doublet where one polarity pulse occurs first in time and a binary "1" to another doublet where the other polarity pulse occurs first in time.

In the prior art of information handling there has been the problem of reconstructing a rectangular voltage waveform after its translation on a magnetostrictive delay line. For each voltage level transition of the rectangular waveform applied to the input transducer of the delay line there is obtained a voltage doublet pulse from the output transducer of the delay line. It is desirable that the waveform reconstruction be accomplished with relatively simple circuitry which is reliable and inexpensive.

In the art of information handling, voltage pulse doublets arise in several instances. One instance is the operation of a magnetostrictive delay line in a non-return-to-zero mode. Another instance is in the operation thereof in a return-to-zero mode. In both these instances, rectangular waveforms are applied to a magnetostrictive delay line and voltage doublets are obtained therefrom. Literature references of interest with regard to information handling in these modes of operation with magnetostrictive delay lines are:

(a) Electronics, August 31, 1962, pages 43–45, "What is the Optimum Mode for Magnetostrictive Delay Lines?"

(b) Instruments and Control Systems, September 1961, pages 1966–19657, "Delay Line Memories."

(c) Proceedings of the IRE, August 1960, pages 1486–1487, "A Non-Return to Zero (NRZ) Mode of Operation for a Magnetostrictive Delay Line."

(d) Proceedings of the Eastern Joint Computer Conference, December 1960, pages 283 et seq., "A High Speed Serial General Purpose Computer Using Magnetostrictive Delay Line Storage."

Accordingly, it is the primary object of this invention to provide apparatus for translating a waveform.

It is another object of this invention to provide apparatus for information handling with pulse doublets.

It is another object of this invention to provide apparatus for reconstructing a rectangular waveform from pulse doublets derived therefrom.

It is another object of this invention to provide apparatus for reconstructing a rectangular voltage waveform applied to a magnetostrictive delay line from voltage doublets obtained from the delay line.

It is another object of this invention to provide apparatus for reconstructing a rectangular waveform applied to a magnetostrictive delay line from voltage doublets obtained from the delay line by separating each voltage doublet into a pair of voltage pulses which cause the operation of a bistable unit.

It is another object of this invention to achieve the foregoing objects with relatively simple circuitry which is reliable and inexpensive.

The foregoing and other objects, features and advantages of this invention will be apparent from the following more particular description of a preferred embodiment of the invention, as illustrated in the accompanying drawings.

The invention obtains reconstruction of a rectangular waveform from pulse doublets derived therefrom by obtaining pulses therefrom which are caused to operate a bistable unit. The output waveform from the bistable unit is a replica of the original waveform delayed in time. In the practice of one aspect of the invention, on pulse of a pair of pulses derived from each pulse doublet is utilize to operate the bistable unit for reconstruction of the original waveform and the other pulse is utilized to resynchronize the bistable unit when necessary.

Figure 1:
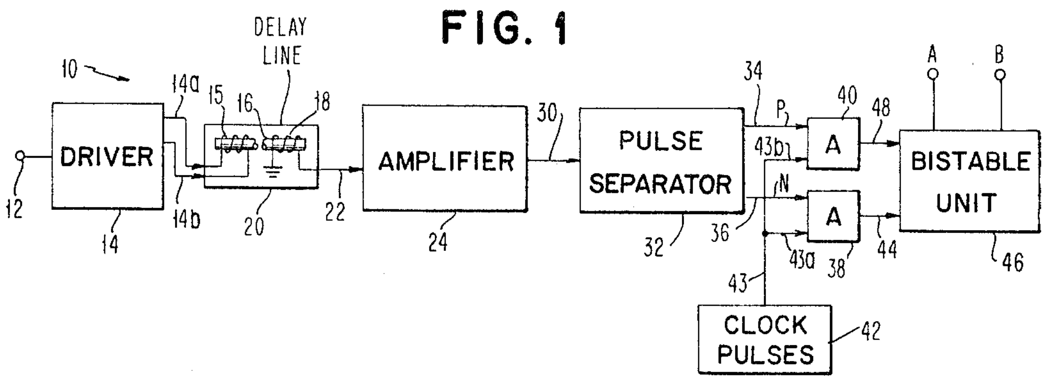
FIGURE 1 is a block diagram of a preferred embodiment of the invention illustrating the manner in which a pair of voltage pulses obtained from a voltage doublet signal causes a bistable unit to produce a rectangular waveform.
Figure 2:
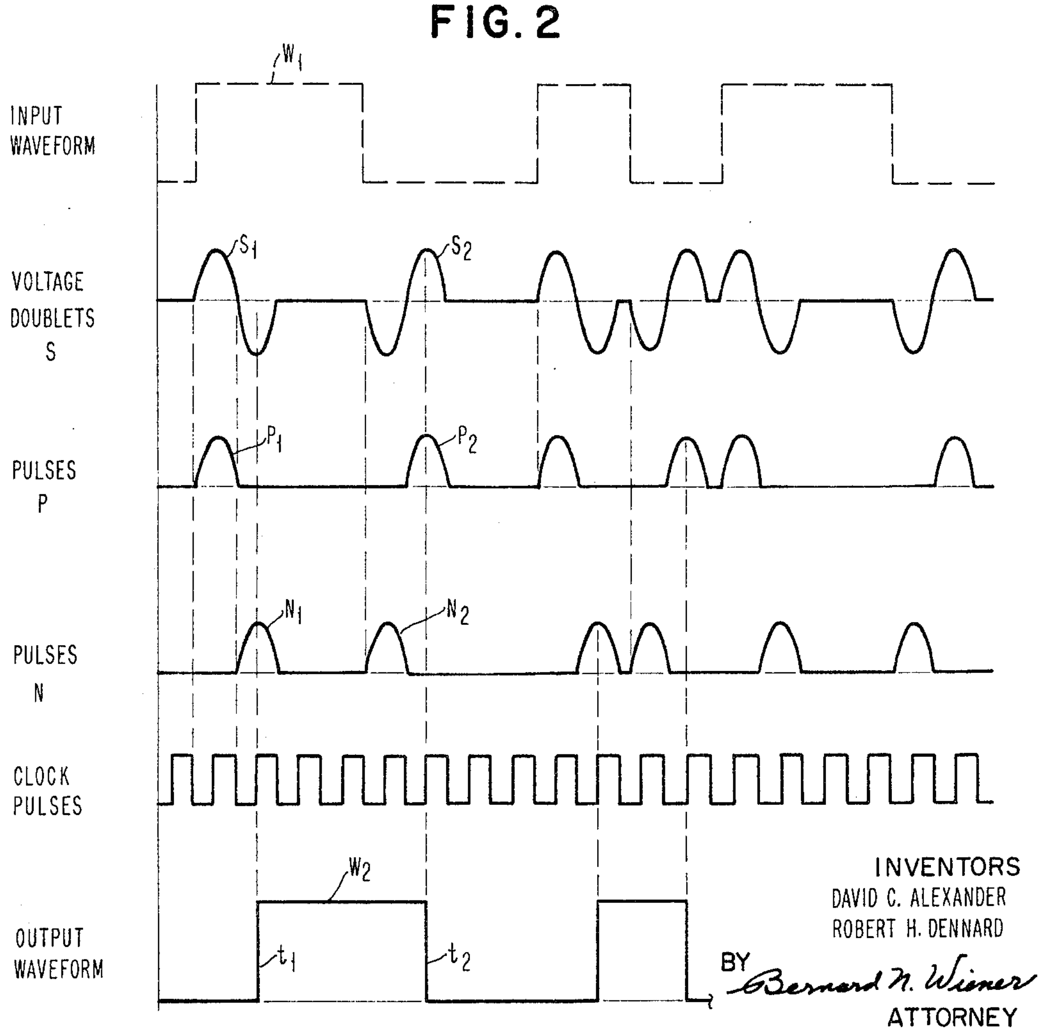
FIGURE 2 is a waveform timing diagram illustrating the time relationships among voltage doublets, pulse pairs derived therefrom, and the rectangular waveform produced by the apparatus of FIGURE 1.

The nature and operation of the invention will be described generally with reference to FIG. 1 which is a block diagram of a preferred embodiment 10 of the invention and FIG. 2 which is a timing diagram therefor. The input rectangular voltage waveform $W_1$ of FIG. 2 is applied to input terminal 12 and the output rectangular voltage waveform $W_2$ of FIG. 2 is obtained from output terminal A. Voltage waveforms $W_1$ and $W_2$ will have voltage levels relative to ground level dependent on operational requirements for embodiment 10. The upper voltage level is termed herein a positive level; and the lower voltage level is termed herein a negative level. Input terminal 12 is connected to drive unit 14 which actuates input transducer 15 of magnetostrictive delay line 16. The transducer 15 may be coupled to magnetostrictive delay line 16 either for torsional or longitudinal vibrations. The delay line 16 together with the input transducer 15 and output transducer 18 is designated as unit 20. Output transducer 18 on the magnetostrictive delay line 16 is connected via line 22 to amplifier unit 24 and provides voltage doublets S (FIG. 2) thereto before amplification in amplifier unit 24. A positive voltage doublet $S_1$ is obtained when voltage waveform $W_1$ goes from a negative level to a positive level; and a negative voltage doublet $S_2$ is obtained when voltage waveform $W_1$ goes from a positive level to a negative level. However, either polarity voltage doublet may be obtained by reversing the connections of output transducer 18.

The voltage doublets S are applied from amplifier unit 24 via line 30 to pulse separator 32 which provides (FIG. 2) the pulses P on line 34 and pulses N on line 36. The pulses P communicate with AND unit 40 and pulses N communicate with AND unit 38. Clock pulses from clock pulse unit 42 also communicate with AND units 38 and 40 via lines 43*a* and 42*b*, respectively. The bistable unit 46 is in the A state when there is a positive voltage level at terminal A; it is in the B state when there is a negative voltage level at terminal A. A clockpulse on line 43*a* and a pulse N on line 36 activate AND unit 38 to provide a drive pulse on line 44 to effect the transition from the B state to the A state of bistable unit 46; a clock pulse on line 43*b* and a pulse P on line 34 activate AND unit 40 to provide a drive pulse on line 48 to effect the transition from the A state to the B state of bistable unit 46. The output waveform $W_2$ on output terminal A of bistable unit 46 is presented in inverse form (not shown in the waveform timing diagram of FIG. 2) at terminal B.

The clock pulses are employed when the waveform $W_1$ is periodic, i.e., that the transitions from one level to the other are at a fixed time spacing $T_0$ or a multiple $nT_0$ of that spacing. The clock pulses are used to retime and reshape the output waveform $W_2$, removing the effects of small variations in delay, noise, or other disturbances. The clock pulses may be obtained from the same source as the data waveform $W_1$ or they may be derived from the voltage doublets S by a conventional technique. In FIG. 2 there is a positive going clock pulse shown in coincidence with both the positive and negative peak excursions of the voltage doublets S. If retiming of the output waveform $W_2$ is not required, the lines 34 and 36 may be passed directly to bistable unit 46 which is designed to be set to the A state by a pulse N on line 36 and to the B state by a pulse P on line 34.

The operation of the embodiment 10 shown in block diagram form in FIG. 1 will now be described in greater detail. The input waveform $W_1$ (FIG. 2) applied to input terminal 12 to cause driver unit 14 to operate the input transducer 15 of the magnetostrictive delay line 16 is rectangular in form. After the effect of the input and the output transducers 15 and 18 of the magnetostrictive delay line 16 as well as the action of the amplifier unit 24 have been accounted for, the voltage doublets S are presented on line 30 to pulse separator 32. With reference to FIG. 2, the illustrative voltage doublets S from amplifier 24 are shown in FIG. 2 as the signals $S_1$ and $S_2$. Each signal S is a voltage doublet having a positive portion and a negative portion. A voltage doublet $S_1$ has an initial positive going portion obtained from the positive going transition of the input waveform $W_1$ and a voltage doublet $S_2$ has an initial negative going portion obtained from the negative going transition of the input waveform $W_1$. The pulse separator 32 provides pulses $P_1$ and $P_2$ from the positive going portions of voltage doublets $S_1$ and $S_2$ on line 34 and pulses $N_1$ and $N_2$ on line 36 from the negative going portions of voltage doublets $S_1$ and $S_2$. Because of the nature of the embodiment 10 of FIG. 1, it is always the second occurring pulse of a voltage doublet S which activates a transition of the bistable unit 46, e.g., pulses $N_1$ and $P_2$ cause transitions $t_1$ and $t_2$ on the output waveform $W_2$.

If the synchronism of bistable unit 46 is impaired, e.g., by a noise voltage pulse on line 34 or 36, the first member of the next pair of pulses $P_1$ and $N_1$ obtained from a voltage doublet restores the synchronism. Illustratively, if a noise voltage pulse caused an unwanted negative shift in the output waveform $W_2$ midway between $t_1$ and $t_2$ in FIG. 2, the output voltage would be in error until pulse $N_2$ is applied to bistable unit 46 since it would reverse the state of the bistable unit 46 and set the output voltage level positive again.

The manner in which synchronism of operation of embodiment 10 is restored after a noise voltage pulse has erroneously altered the state of bistable unit 46 will now be described in greater detail. Every pulse P and N on the lines 34 and 36 from pulse separator 30 tends to achieve the waveform $W_2$. Illustratively, pulse $P_1$ would make waveform $W_2$ negative if it were not already negative, and pulse $N_2$ would make waveform $W_2$ positive if it were not already positive. In starting the operation of embodiment 10, the first pulse from pulse separator 32 on either lines 34 or 36 sets the bistable unit 46 in the proper state A or B and subsequent pulses change the state as described above. In the case of an error due to a noise voltage pulse, the next pulse $N_1$ or $P_1$ corrects the state of bistable unit 46. Except during the conditions of starting operation and synchronizing of embodiment 10, the first member of the voltage doublet S carries redundant information. Because of this redundancy, the embodiment 10 may be operated at a data rate for which the first half of a voltage doublet overlaps the last half of a previous voltage doublet present in the previous time interval as will be described hereinafter with reference to FIG. 3.

Figure 3:
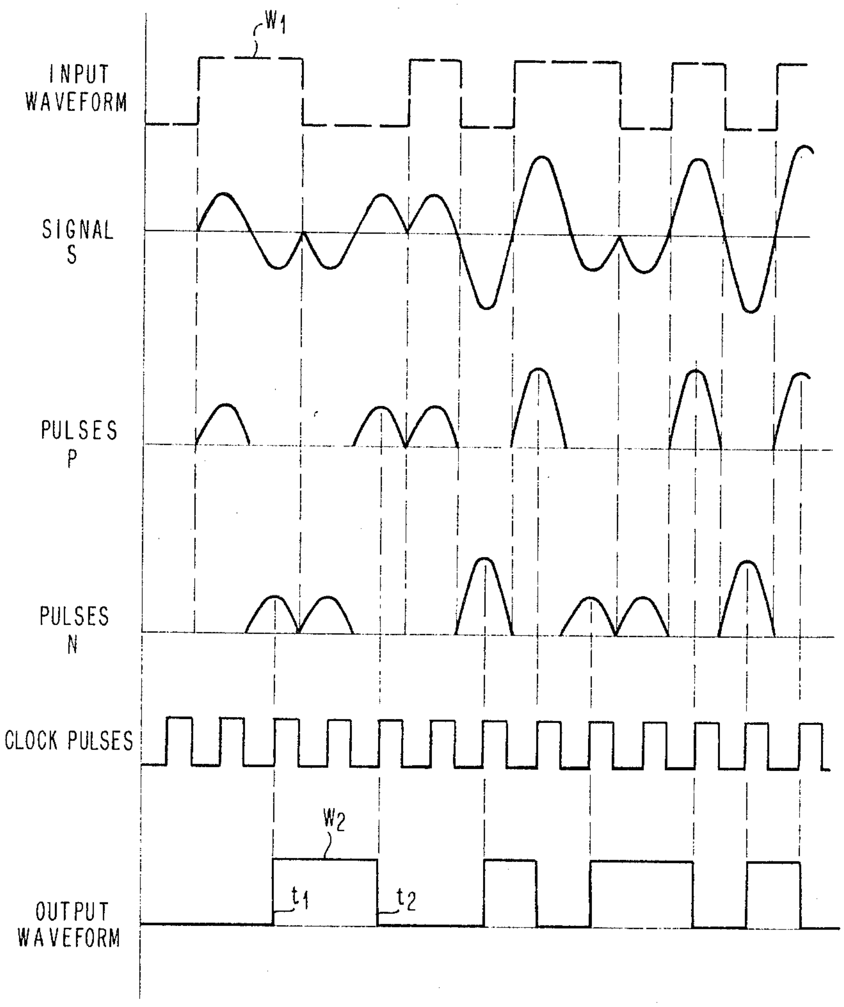
FIGURE 3 is a waveform timing diagram illustrating the operation of the embodiment of FIGURE 1 when the rate occurrence of voltage doublets is high enough to cause overlap of sequential voltage doublets.

The operation of the embodiment 10 of FIG. 1 for a repetition rate of signal voltage doublets S so high that sequential voltage doublets overlap, will be described with reference to FIG. 3. It is observed that the second occurring portion of one voltage doublet (signal S) adds to the first occurring portion of the following voltage doublet. Although the pulse separator 32 now provides certain pulses P and pulses N having greater magnitudes than other pulses P and pulses N, the effect on the operation of the bistable unit 46 by the drive pulses applied thereto on lines 44 and 48 from AND units 38 and 40 is similar to the effect obtained through the operation in accordance with the waveform timing diagram of FIG. 2 where the voltage doublet S repetition rate is not great enough to cause overlap of positive or negative portions. The output waveform $W_2$ on terminal A of bistable unit 46 is a replica of the input waveform $W_1$ applied to input terminal 12 of driver unit 14.

Figures 4, 4A:
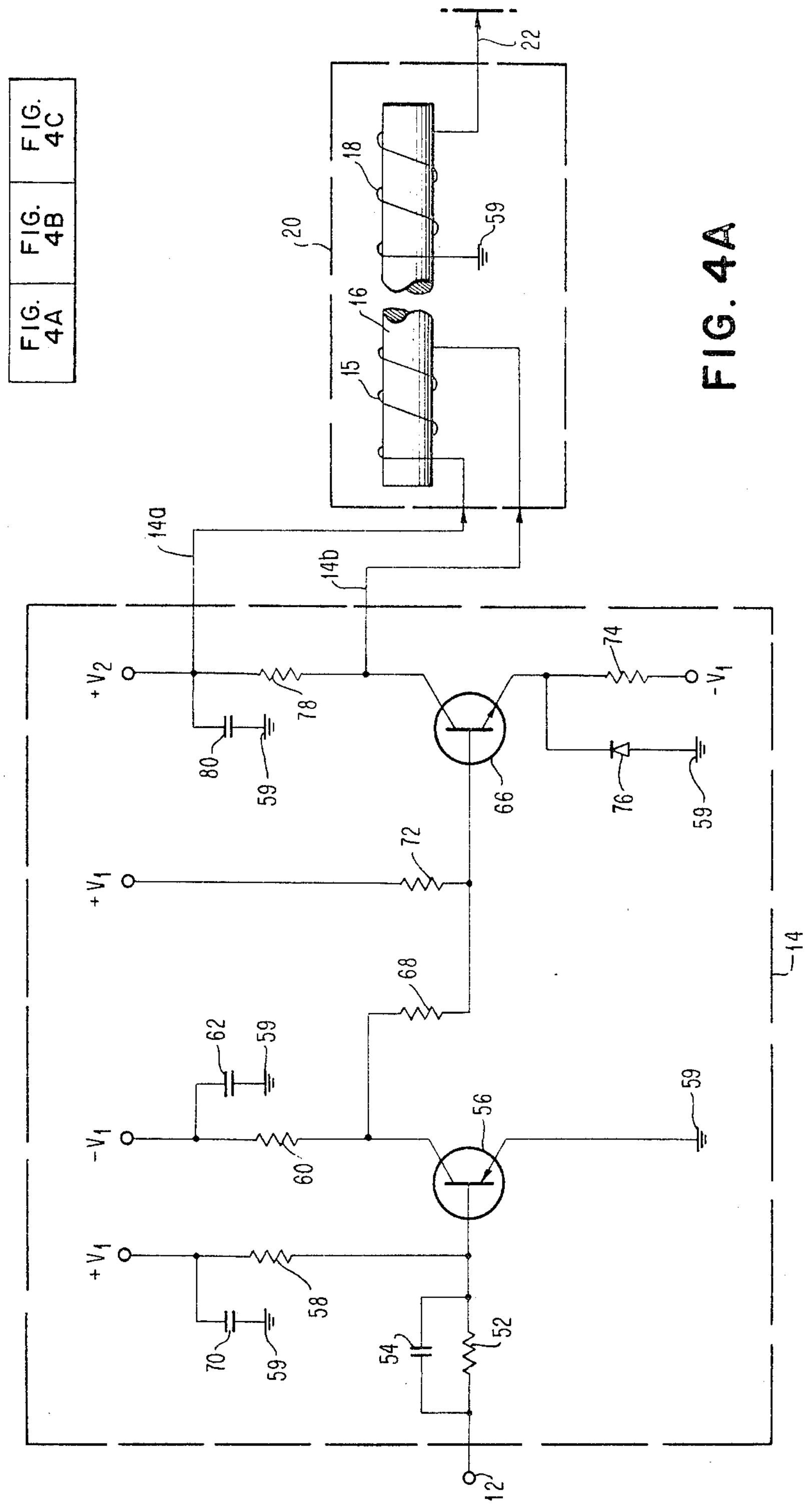
FIGURE 4 is a schematic diagram of the embodiment of the invention shown in block form in FIGURE 1.
FIGURE 4A shows the amplifier driver unit for applying a rectangular voltage waveform to the input of a magnetostrictive delay line.

The nature and operation of the embodiment shown in block diagram form in FIG. 1 will now be described in greater detail with reference to the schematic diagram thereof shown in FIG. 4. The particular operation will be described with reference to the waveform timing diagram of FIG. 2 although it will be understood that its operation as described hereinbefore with reference to FIG. 3 is also applicable. The driver unit 14 (FIG. 4A) performs the function of taking a signal input waveform $W_1$ at a voltage level of zero or $-V_1$ such as may be presented from a computer logical system, not shown, and amplifying it to the voltage and power requirements necessary to drive the transducer 15 on the delay line 16. The signal input waveform $W_1$ is applied via terminal 12 and the parallel combination of resistance 52 and capacitance 54 to the base of PNP transistor 56 to which is also applied power supply voltage $+V_1$ via resistance 58 for biasing transistor 56 under the operational condition for embodiment 10 that input waveform $W_1$ transits between ground a negative voltage level. The collector of transistor 56 is connected via resistance 60 to power supply voltage $-V_1$. High frequency transients at power supply $-V_1$ are bypassed by a capacitance 62 to ground 59. Ground 59 is connected to the emitter junction of transistor 56. Transistor 56 amplifies mainly the power of the input waveform $W_1$ applied to terminal 12 to supply somewhat more current to transistor 66 than is available from the input waveform $W_1$. The collector of transistor 56 is connected via resistance 68 to the base of transistor 66. Power supply voltage $+V_1$ is connected via capacitance 70 to ground 59 and via resistance 72 to the base of transistor 66. The emitter of NPN transistor 66 is connected via resistance 74 to power supply voltage $-V_1$ and ground 59 is connected via diode 76 to the emitter of transistor 66. The output on lines 14*a* and 14*b* of driver unit 14 is obtained across resistance 78 connected between power supply voltage source $+V_2$, which is a somewhat larger voltage than $+V_1$, and the collector of transistor 76. Voltage source $+V_2$ is connected via capacitance 80 to ground 59. Transistor 66 provides both voltage gain and power gain for the input waveform $W_1$ (FIG. 2).

Figure 4B:
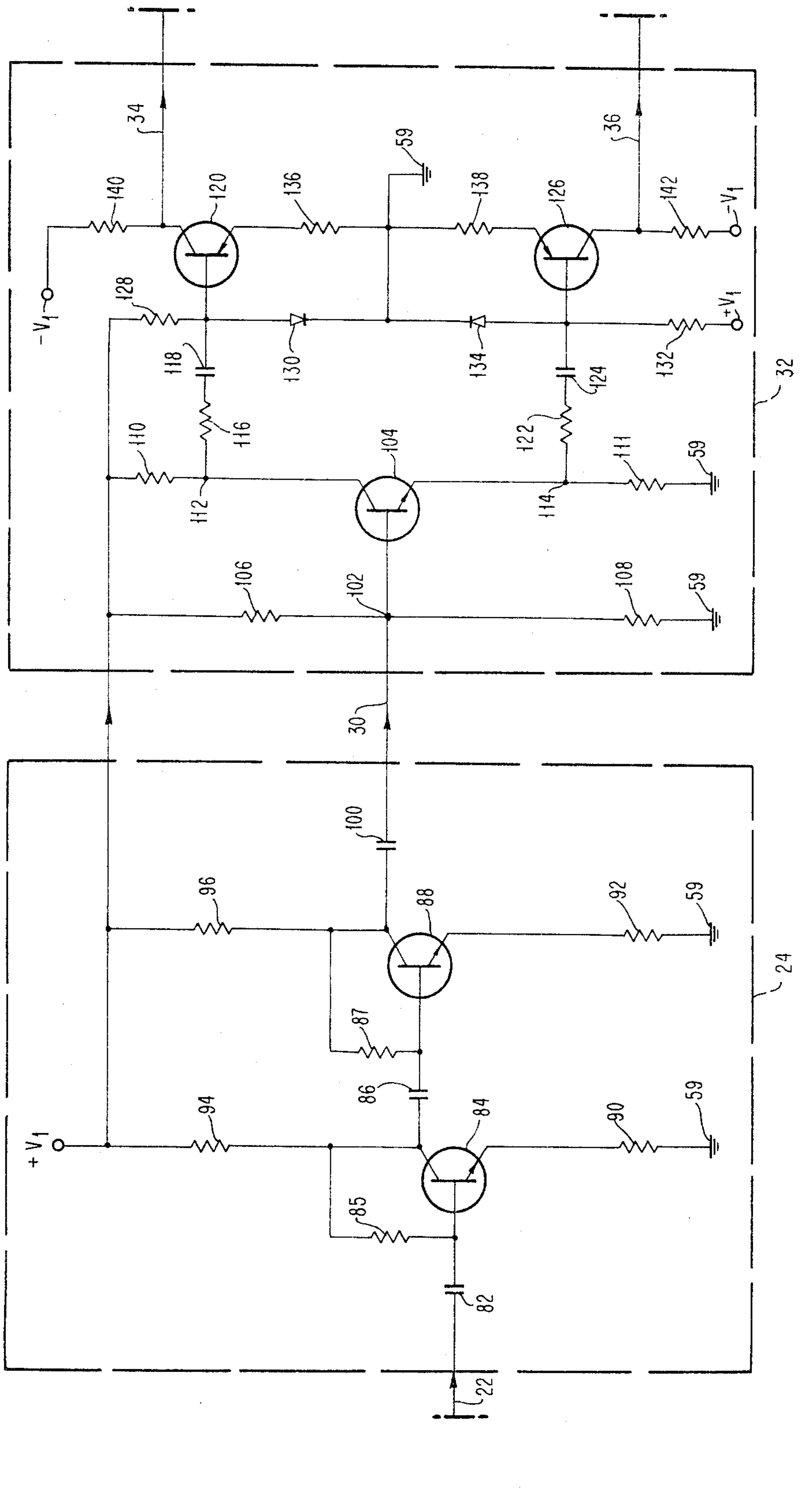
FIGURE 4B shows an amplifier unit for raising the voltage levels of the output voltage doublets from the magnetostrictive delay line and the pulse separator for obtaining pulse pairs from a voltage doublet.

The output from magnetostrictive delay line unit 20 is applied on line 22 via capacitance 82 (FIG. 4B) to the base of NPN transistor 84 of amplifier unit 24. Amplifier unit 24 restores the signal level which has decreased because of attenuation on magnetostrictive delay line unit 20. The capacitance 86 between the collector of transistor 84 and the base of NPN transistor 88 passes the A.C. signal while blocking the D.C. level. The emitters of transistors 84 and 88 are connected via resistances 90 and 92 to ground 59. Collectors of transistors 84 and 88 are connected via resistances 94 and 96 to power supply voltage $+V_1$. The output of transistor 88 is connected via capacitance 100 as the input to pulse separator unit 32. Feedback resistors 85 and 87 between the collector and base of transistors 84 and 88, respectively, provide stability and linearity in the amplification.

The signal voltage doublets S (FIG. 2) containing the information on the transitions of the input waveform $W_1$ between voltage levels thereof are applied from amplifier unit 24 to pulse separator unit 32 (FIG. 4B) on terminal 102 thereof and therefrom to the base of an NPN transistor 104 which provides the function of a phase-splitter. Resistances 106 and 108 connected between terminal 102 and positive voltage source $+V_1$ and ground 59, respectively, are used to obtain a bias for the input to the transistor 104. Resistance 110 connected between the collector of transistor 104 and positive voltage source $+V_1$ and resistance 111 connected between the emitter of transistor 104 and ground 59 are the output load for the transistor 104 and have substantially the same resistance value. The signal voltage doublet S appears essentially unchanged at emitter terminal 114 of transistor 104 while the same signal appears at collector terminal 112 thereof in inverted form. Terminal 112 is connected via resistance 116 and capacitance 118 to the base of PNP transistor 120 and emitter junction terminal 114 is connected via resistance 122 and capacitance 124 to the base of PNP transistor 126. The transistors 120 and 126 function to remove or clip the positive going portions of the waveforms presented to their respective bases while providing amplification and limitation of the negative going portions. Capacitances 118 and 124 block the D.C. between the transistor circuit 104 and the transistor circuits 120 and 126, respectively. The base of transistor 120 is connected via resistance 128 to voltage supply $+V_1$ and via the cathode of diode 130 to ground 59; and the base of transistor 126 is connected via resistance 132 to positive voltage source $+V_1$ and via the cathode of diode 134 to ground 59. The structure of pulse separator 32 is completed as follows: ground 59 is connected via resistance 136 to the emitter junction of PNP transistor 120 and via resistance 138 to the emitter junction of PNP transistor 126; the collector of transistor 120 is connected via resistance 140 to power supply voltage $-V_1$ and to line 34; the collector of transistor 126 is connected via resistance 142 to power supply voltage $-V_1$ and to line 36. As a consequence of the operation of the pulse separator 32, the pulses P are presented to line 34 and the pulses N are presented to line 36. In an illustrative operation of the pulse separator 32, for a voltage doublet $S_1$ having its initial portion as a positive going pulse and its next portion as a negative going pulse, pulse P on line 34, from $-V_1$ volts to zero volts and back the positive pulse causes a corresponding positive going to $-V_1$ volts, and a similar pulse N on line 36 is caused by the negative going pulse portion of voltage doublet $S_1$.

The function of the diodes 130 and 134 will be described generally with reference to the performance of diode 130 which provides a current path to ground 59 for the positive going portion of the signal presented to the base of transistor 120. Thus, the balanced current path, i.e., for the negative going portion via diode 130 and for the positive going portion to the base of transistor 120 from capacitance 118 prevents an unbalanced flow of current through the capacitor 118 which would change the bias level at the base of transistor 120 in accordance with the magnitude of the voltage doublet.

Figure 4C:
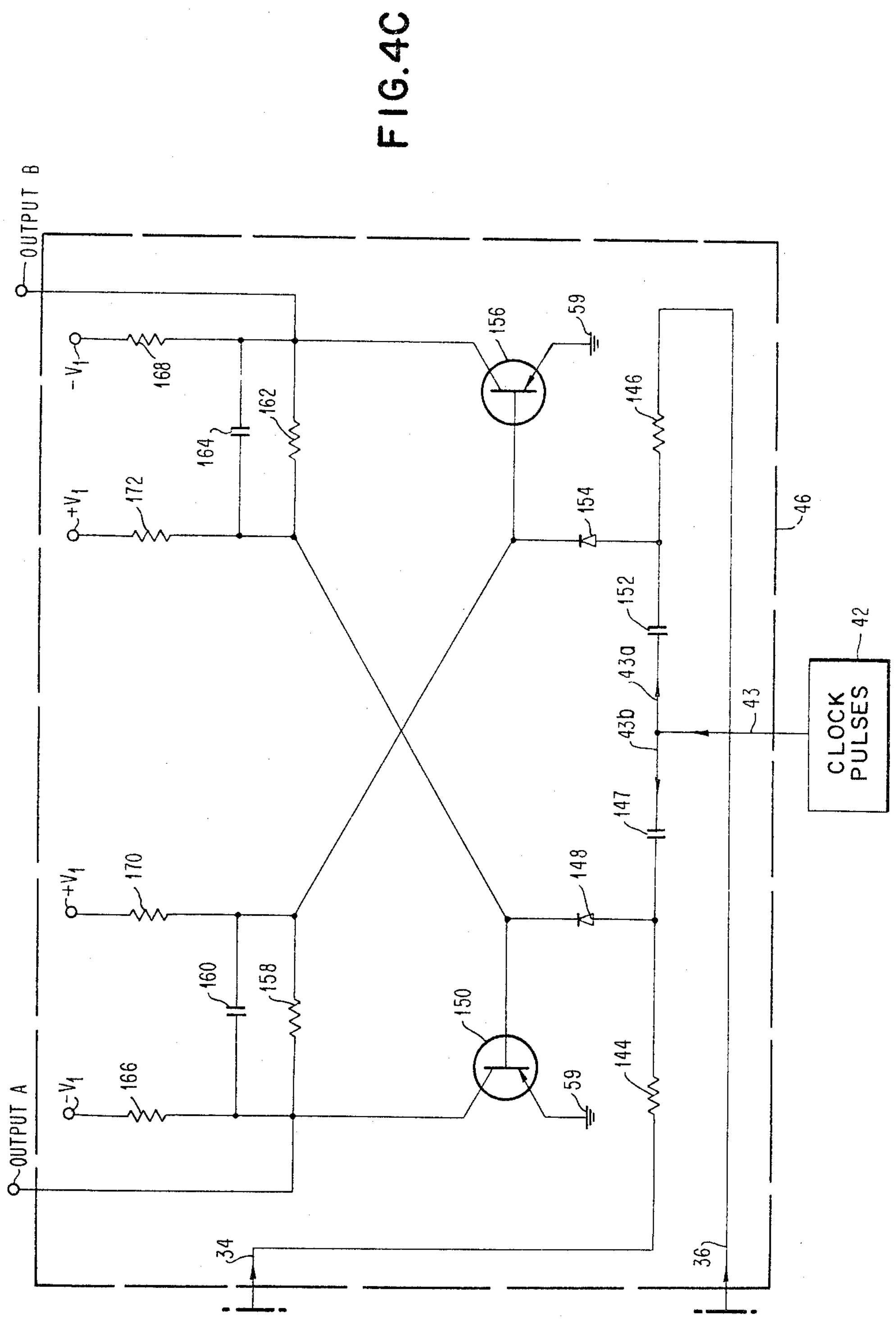
FIGURE 4C shows a flip flop circuit suitable for the bistable unit of the embodiment of FIGURE 1

The detailed operation of flip-flop 46 as presented in schematic diagram form in FIG. 4C will now be described. The output pulses P (FIG. 2) on line 34 from pulse separator 32 are presented to flip-flop unit 46 via resistance 144 and the pulses N on line 36 from pulse separator 32 are presented to flip-flop unit 46 via resistance 146. Clock pulses (FIG. 2) are presented from clock pulse source 42 via line **43*b*, capacitance 147 and the cathode of diode 148 to the base of PNP transistor 150; and via line 43*a* capacitance 152 and the cathode of diode 154 to the base of PNP transistor 156. Resistance 144 and capacitance 147 and the AND unit 40 of FIG. 1 and resistance 146 and capacitance 152 are the AND unit 38 of FIG. 1. Transistor 150 is cross coupled to transistor 156 as follows: the collector thereof is connected via the parallel path of resistance 158 and capacitance 160 to the base of transistor 156. Transistor 156 is cross coupled to transistor 150 in the following manner: the collector of transistor 156 is connected via parallel path of resistance 162 and capacitance 164 to the base of transistor 150. Ground 59 is connected to the emitters of transistors 150 and 156. The circuit connections of flip-flop unit 46 are completed as follows: the collector of transistor 150 is connected via resistance 166 to power supply voltage $-V_1$ and to output A terminal; the collector of transistor 156 is connected via resistance 168 to power supply voltage $-V_1$ and to output B terminal; and the bases of transistors 150 and 156 are connected via resistances 170 and 172** to power supply voltage $+V_1$.

In operation, the circuit connections of flip-flop unit 46 are such that the transistors 150 and 156 are biased and cross coupled in a manner that only one transistor may be conducting at a time. When the state of flip-flop unit 46 is such that one transistor is conducting, the state of the flip-flop is changed only when a positive pulse is passed to the base of the transistor which is conducting, causing it to cease conducting. Illustratively, if transistor 150 is conducting, i.e., its collector terminal (output terminal A) is nearly at ground potential, the pulse P applied via line 34 enables a sharp pulse, i.e., the positive-going edge of the clock pulse of FIG. 3, to be applied to the base of transistor 150 which cuts it off. As a consequence, the potential at the collector, i.e., the output at terminal A makes a negative transition thereby replicating the original transition of the rectangular waveform applied to the input terminal 12 connected to driver unit 14. The circuit operation of flip-flop unit 46 is such that when transistor 150 ceases conducting, transistor 156 does conduct. In this manner a waveform available at output terminal B, not shown, is the inverse of the rectangular waveform obtained from output A terminal. The waveform $W_2$ at terminal A is the replica of the waveform $W_1$ applied to input terminal 12.

When a pulse P or N is not present on lines 34 or 36, they are at approximately the voltage $-V_1$ level which causes diodes 148 and 154 to be reverse biased such that clock pulses on lines **43*b* and 43*a* are blocked by the diodes and the transistors 150 and 156** remain in their present state of conduction or non-conduction. While the invention has been particularly shown and described with reference to a preferred embodiment thereof, it will be understood by those skilled in the art that various changes in form and details may be made therein without departing from the spirit and scope of the invention.

What is claimed is:

1. Apparatus for waveform translation comprising, in combination:

first magnetostrictive delay line means to provide a plurality of pulse doublets from said waveform;

second means to provide pulses from said doublets; and third means operable by said pulses to provide a replica of said waveform.

2. Apparatus according to claim 1 in which:

said second means is a pulse separator; and said third means is a bistable means.

3. Apparatus according to claim 1 in which said first means provides said pulse doublets in an overlapped manner.

4. Apparatus for rectangular voltage waveform translation comprising, in combination:

magnetostrictive delay line means receptive of said waveform to provide a voltage doublet for each voltage level transition of said waveform;

means to provide voltage pulses from said doublets; and bistable means operable by said latter pulses to provide a replica of said rectangular waveform.

5. Apparatus for waveform translation comprising, in combination:

first magnetostrictive delay line means to provide a sequence of pulse doublets;

second means to provide a pair of pulses from each said pulse doublet; and third means operable by said pairs of pulses to provide a replica of said waveform.

6. Apparatus according to claim 5 in which:

said second means is a pulse separator; and said third means is a bistable means.

7. Apparatus for rectangular voltage waveform translation comprising, in combination:

magnetostrictive delay line means receptive of said waveform to provide a voltage doublet for each voltage level translation of said waveform;

means to provide a pair of voltage pulses from each said respective doublet; and bistable means operable by said latter pulses to provide a replica of said rectangular waveform.

8. Apparatus for rectangular voltage waveform translation comprising, in combination:

a driver unit receptive of said waveform;

a magnetostrictive delay line unit coupled to said driver unit to provide pulse waveforms representative of the voltage level transition of said rectangular waveform;

an amplifier unit coupled to said delay line unit;

a pulse voltage separator coupled to said amplifier unit to provide voltage pulses from said pulse waveforms; and bistable means operable by said voltage pulses to provide a replica of said rectangular voltage waveform.

9. Apparatus for information handling comprising, in combination:

first magnetostrictive delay line means to provide a plurality of pulse doublets alternating in polarity representative of said information;

second means to obtain pulses from said doublets; and third means operable by said latter pulses to provide a rectangular waveform representative of said information, said latter waveform having a level transition for each said respective doublet.

10. Apparatus according to claim 9 in which said third means is a bistable means.

11. Apparatus for information handling comprising, in combination:

first magnetostrictive delay line means to provide pulse doublets alternating in polarity representative of said information;

second means to separate each said doublet into a respective pair of pulses; and third means operable by said latter pulses to provide a rectangular waveform representative of said information, said latter waveform having a level transition for each said respective doublet.

12. Apparatus according to claim 11 in which said third means is a bistable means.

References Cited by the Examiner

UNITED STATES PATENTS

| | | | |
|---|---|---|---|
| 2,791,687 | 5/1957 | Mandel | 328—36 |
| 2,931,981 | 4/1960 | Schabauer | 328—55 |
| 3,034,062 | 5/1962 | Bleam | 328—56 |
| 3,060,331 | 10/1962 | Habisohn | 307—88.5 |
| 3,062,969 | 11/1962 | Wilkerson | 307—88.5 |
| 3,115,618 | 12/1963 | Rothbart | 340—173 |
| 3,198,961 | 8/1965 | Millsap | 307—88.5 |

ARTHUR GAUSS, *Primary Examiner.*

I. C. EDELL, *Assistant Examiner.*